(No Model.)

T. G. HALL.
PLUMB LEVEL.

No. 419,329. Patented Jan. 14, 1890.

Witnesses:
W. M. Valentine
A. Alcock

Inventor:
Thomas G. Hall
by Brosman & Bull
Attys

UNITED STATES PATENT OFFICE.

THOMAS G. HALL, OF BROOKLYN, NEW YORK.

PLUMB-LEVEL.

SPECIFICATION forming part of Letters Patent No. 419,329, dated January 14, 1890.

Application filed December 1, 1888. Serial No. 292,398. (No model.)

*To all whom it may concern:*

Be it known that I, THOMAS G. HALL, a citizen of the United States, residing at Brooklyn, in Kings county, State of New York, have invented a new and useful mechanical instrument for determining the horizontal and vertical plane or measuring the angles of planes in the fabrication of mechanical structures, of which the following is a description in such full, clear, concise, and exact terms as will enable any one skilled in the art to which my said invention appertains or with which it is most nearly connected to make and use the same, reference being had to the accompanying drawings, making part of this specification, and to the letters of reference marked thereon.

Similar letters of reference on the several figures represent corresponding parts of the same.

Figure 1:
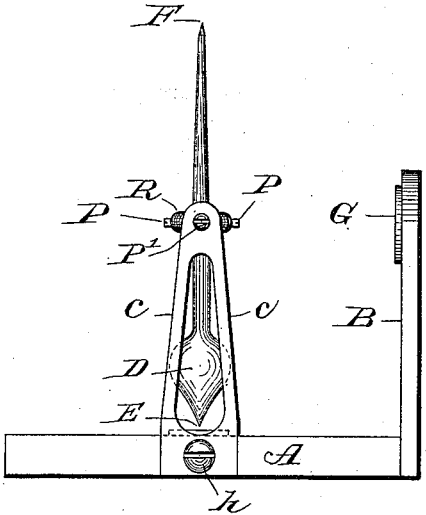
Figure 2:
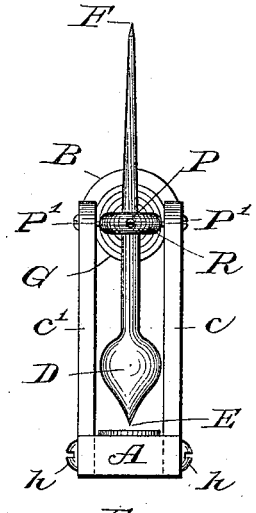
Figure 3:
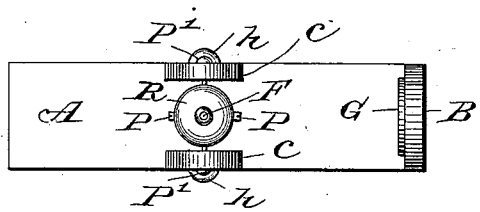
Figure 4:
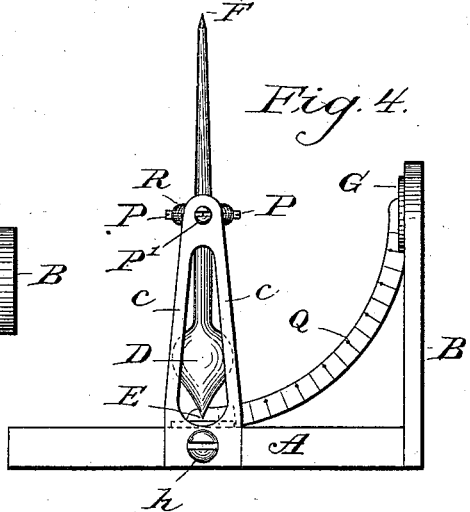

Figure 1 illustrates in elevation a plumb-level containing my present improvements. Fig. 2 illustrates an end elevation of the same. Fig. 3 illustrates a top view, and Fig. 4 illustrates a modified form, of the said plumb-level, parts being broken away.

The following is a description of the instrument illustrated in the accompanying drawings, which show one of the forms in which I now prefer to embody my said inventions in total combination.

The specific features of my invention will be particularly pointed out in the claims concluding this specification.

The instrument shown in the drawings is composed, primarily, of two metal plates A and B, (preferably of steel,) having their ends joined together at right angles, as illustrated by the several figures of the drawings, and said instrument is further composed of a vertical supporting-frame composed of plates $c$ and $c'$, the bottom ends of which are fitted into the plate A and secured there by means of screws $h$. These plates $c$ and $c'$ are fitted into the edges of plate A to stand parallel with each other, so that a line drawn vertically between them or through their center will be exactly vertical with the bottom plane of plate A in both directions and parallel with the external plane of plate B, and also in such manner as to bring the center between the tops of said plates exactly over the center of plate A transversely. Said instrument consists, also, of a double-pointed pendulum D F, suspended at the top and centrally between the vertical plates $c$ and $c'$ by means of a universal joint, said joint being composed of a ring R, through which the pointed stem F of the pendulum passes and in which it is suspended upon pivots P', the ring being suspended between the top of plates $c$ and $c'$ by pivots P; and said instrument also consists of indicating-points composed of circular bosses raised one on the top surface of plate A and one on the upper end of the inside surface-plate B. In the center of these bosses a center mark is made directly under the suspending-centers of the pendulum, so that when the point on either end of the pendulum is exactly over either center mark the outside surfaces of one of said plates will be exactly horizontal and the other exactly vertical, so that in the construction of any mechanical work the horizontal or vertical position of any of its parts may be quickly ascertained by the aid of this instrument, and in case it be desired to ascertain the angle of any one plane to another, that is quickly done by means of a quadrant Q, set in the angle of the two plates on the curve described by the swing of the pendulum, as illustrated by the drawings.

The object of the point on the long stem of the pendulum above its point of suspension is to enable the workman to place the instrument against the bottom plane of any part the horizontal position of which it may be desirable to ascertain, and for this purpose the two ends of the pendulum are made of substantially the same length.

It will of course be understood that the instrument is constructed in harmony with the well-known laws of gravitation, there being nothing new in the instrument beyond the combination and relation of its several parts, as pointed out in the claims.

In constructing the instrument due attention must be paid to accuracy in the construction and adjustment of its parts. The pendulum should have ample room to swing between or on its supporting-frame, and the joints and points of suspension should be nicely made and adjusted to insure a good instrument. It will be readily understood that if the object be merely to ascertain the horizontal position of the top or bottom plane of any part or parts, B and Q of the instrument may be omitted, retaining only the plates A, the suspending-frame $c$ and $c'$, and the double-pointed pendulum D F, and so in cases where it is desirable to have an instrument that will measure either or both the vertical and horizontal position of any part or parts. In such cases the parts A, B, C, D, and F should be retained, omitting the part Q; but in cases where it is desirable to measure the angle of any part with reference to any vertical or horizontal plane the part Q should be retained, as illustrated.

It will of course be understood that my invention is not limited to the precise devices or combinations of devices shown, as various modifications not affecting the principles of the device may be made without departing from the claims.

Having now described my invention, I claim as new, and desire to secure by Letters Patent, as follows:

1. In a plumb-level, the combination of a base-plate, a supporting-frame, a universal joint carried by said frame, and a double-pointed pendulum having its ends of substantially the same length carried by said universal joint, substantially as described.

2. An instrument for determining the horizontal or vertical position of any plane of any of the parts of a mechanical structure, consisting of the following parts in combination, viz: the plates A and B, the suspending-frame $c$, the pendulum D F, carried by a universal joint in the frame $c$, and the indicating-points G and E, fixed upon the plates A and B, as set forth.

3. An instrument for measuring the angle of any part of a mechanical structure with reference to any of the vertical or horizontal parts composing said structure, consisting of the following parts in combination, viz: the plates A and B, a suspending-frame $c$, a pendulum D F, carried by a universal joint in said frame, a quadrant Q, or other section of a circle duly divided into degrees, and the indicating-points G and E, substantially as described.

4. In a plumb-level, the combination of a base-plate, a plate at right angles to said base-plate, a suspending-frame, a universal joint carried by said frame, and a pendulum carried by said universal joint, and indicating-marks on said base-plate and said plate at right angles thereto, substantially as described.

5. In a plumb-level, the combination of a base-plate, a plate at right angles to said base-plate, a suspending-frame, a universal joint carried by said frame, and a pendulum carried by said universal joint, and a quadrant divided into degrees, substantially as described.

THOMAS G. HALL.

Witnesses:
AMOS B. BROADNAX,
WM. H. BROADNAX.